United States Patent
Stone et al.

(10) Patent No.: US 7,030,814 B2
(45) Date of Patent: Apr. 18, 2006

(54) SYSTEM AND METHOD TO ESTIMATE THE LOCATION OF A RECEIVER IN A MULTI-PATH ENVIRONMENT

(75) Inventors: Jesse Stone, Palo Alto, CA (US); Stefano Casadei, Cambridge, MA (US); Wallace Mann, Mill Valley, CA (US); Benjamin Van Roy, San Mateo, CA (US)

(73) Assignee: SiRF Technology, Inc., San Jose, CA (US)

( * ) Notice: Subject to any disclaimer, the term of this patent is extended or adjusted under 35 U.S.C. 154(b) by 110 days.

(21) Appl. No.: 10/237,556

(22) Filed: Sep. 6, 2002

(65) Prior Publication Data

US 2004/0008139 A1 Jan. 15, 2004

Related U.S. Application Data

(60) Provisional application No. 60/318,216, filed on Sep. 7, 2001.

(51) Int. Cl.
*G01S 3/02* (2006.01)

(52) U.S. Cl. .................... 342/451; 342/108
(58) Field of Classification Search ............. 342/108, 342/451, 453, 457; 455/65
See application file for complete search history.

(56) References Cited

U.S. PATENT DOCUMENTS 5,488,589 A * 1/1996 DeAngelis ................. 367/131
5,515,062 A * 5/1996 Maine et al. ............... 342/457
5,537,511 A * 7/1996 DeAngelis et al. .......... 706/24
6,092,033 A * 7/2000 Uhlmann .................... 702/189

* cited by examiner

Primary Examiner—Dao Phan
(74) Attorney, Agent, or Firm—Edward C. Kwok; MacPherson Kwok Chen & Heid LLP (57) ABSTRACT

System and method to determine the location of a receiver in a multipath environment are provided. The received signal is correlated with the reference signals associated with the transmitting sources. Each correlation function is processed to derive various types of signal constraints, such as probability densities and uncertainty regions or intervals. In some embodiments, these constraints are for the code-phases and the Doppler frequencies. These signal constraints are transformed into constraints on the receiver variables and then fused together into a unified receiver constraint. A-priori constraints, such as constraints on the location of the receiver or the timestamp, may be incorporated into the unified receiver constraint. Some embodiments estimate a location based also on the estimated Doppler frequency. The constraints used by the invention are based on models of multipath effects and are geared towards mitigating these effects. In one of these models, a probability density for code-phase is obtained by convolving a gaussian distribution with an exponential distribution that describes the extra delay introduced by multipath. Another approach is based on identifying outliers in the set of code-phases. In other approaches, uncertainty region constraints and probability densities are combined. The present invention achieves faster and more sensitive signal acquisition and higher location accuracy in multipath environment, without compromising performance in other environments.

56 Claims, 6 Drawing Sheets

SYSTEM AND METHOD TO ESTIMATE THE LOCATION OF A RECEIVER IN A MULTI-PATH ENVIRONMENT

CROSS REFERENCE TO RELATED APPLICATIONS

This application claims the benefit of U.S. Provisional Patent Application No. 60/318,216, filed Sep. 7, 2001, entitled "Estimation of Receiver Location and Other Parameters in Multipath Environments".

FIELD OF THE INVENTION

The present invention relates to signal processing and, more particularly, to techniques for estimating the location and other variables of a receiver in a multipath environment by processing a signal that contains location-determining signals transmitted by a set of sources.

BACKGROUND OF THE INVENTION

Some position determining systems determine certain receiver variables, such as location, velocity and certain parameters of the receiver's clock, by receiving and processing a signal containing location-determining signals transmitted by a plurality of sources. These receiver variables are estimated by first estimating certain signal variables, such as code-phase and Doppler frequency and then by performing a triangulation operation that is based on an equation relating the signal's code-phase to the signal's propagation delay, and on the linear relationship between the propagation delay and the geometric distance from the source to the receiver. The latter relationship assumes that the transmitted signal reaches the receiver by traveling on a straight line and that the speed of light is constant along this path. In certain environments, "multipath" phenomena such as reflection, diffraction, diffusion, scattering, may in-validate these assumptions by generating multiple copies of the signal that reach the receiver with longer delays. As a consequence, the correlation function used to the detect the signal may contain several large peaks. Furthermore, the direct-path peak may be significantly attenuated or eliminated due to occlusion or negative interference, and the highest detected peak may correspond to a signal received through a reflected path.

The straightforward least-square triangulation methods that assume straight unaltered propagation paths may perform very poorly in multipath environment. A method to mitigate multipath effects is disclosed in U.S. Pat. No. 5,630,208, "Adaptive Multipath Equalization" by Enge et al. This method is based on the identification of certain features of the correlation function near the peak. In one example, the correlation is sampled at two pairs of points symmetrically located on each side of the peak. One pair of points are close to each other (narrow spacing), the other pair are further apart (wide spacing). The correlation values at these four points are combined to mitigate multipath effects. In a second example, multipath signal strengths and phases are estimated by using multiple samples of the correlation function. This second approach assumes that path delays of the direct signal and of the multipath signals can be determined separately. Three approaches are proposed to determine path delays: (1) identification of slope transition points in the correlation function; (2) cepstrum processing of the received signal, using Fourier transform analysis; and (3) use of a grid of time points on the correlation function domain, and identification of time values, associated with certain solution parameters of the least mean squares analysis that have the largest absolute values, as times of arrival of the direct and multipath signals.

These methods perform well only when the distorted correlation function contains the direct-path peak and only a small additional number of distinct and delayed peaks. Therefore, there is a need for a method to mitigate multipath phenomena that overcomes these limitation.

SUMMARY OF THE INVENTION

The present invention overcomes the limitations of previous approaches by incorporating the uncertainty caused by multipath effects into the estimation of the receiver variables. The method is based on representing multipath uncertainty by means of signal constraints and receiver constraints. Embodiments of this method generate, transform, and fuse constraints to obtain a final estimate of the receiver variables in a way that mitigates multipath effects. The term "constraint" encompasses any means or device that conveys uncertain information about one or more variables. Sometimes, the term "uncertainty representation" is used as a synonym of "constraint". An example of a constraint is a probability density. Another example is an uncertainty region, that is, a subset of the space to which a particular variable or set of variables belong. Such a subset can be described, for instance, by a set of linear inequalities. Another example of a constraint is a collection of probability densities. This type of constraint can be described, for instance, by a parametric probability density whose parameters are constrained to be within certain ranges. Another example is a system of linear equations. Another type of constraint is a "sub-probability" density whose total mass is less than one. The missing mass is associated to an outlier event for which no constraint is provided.

Figure 1:
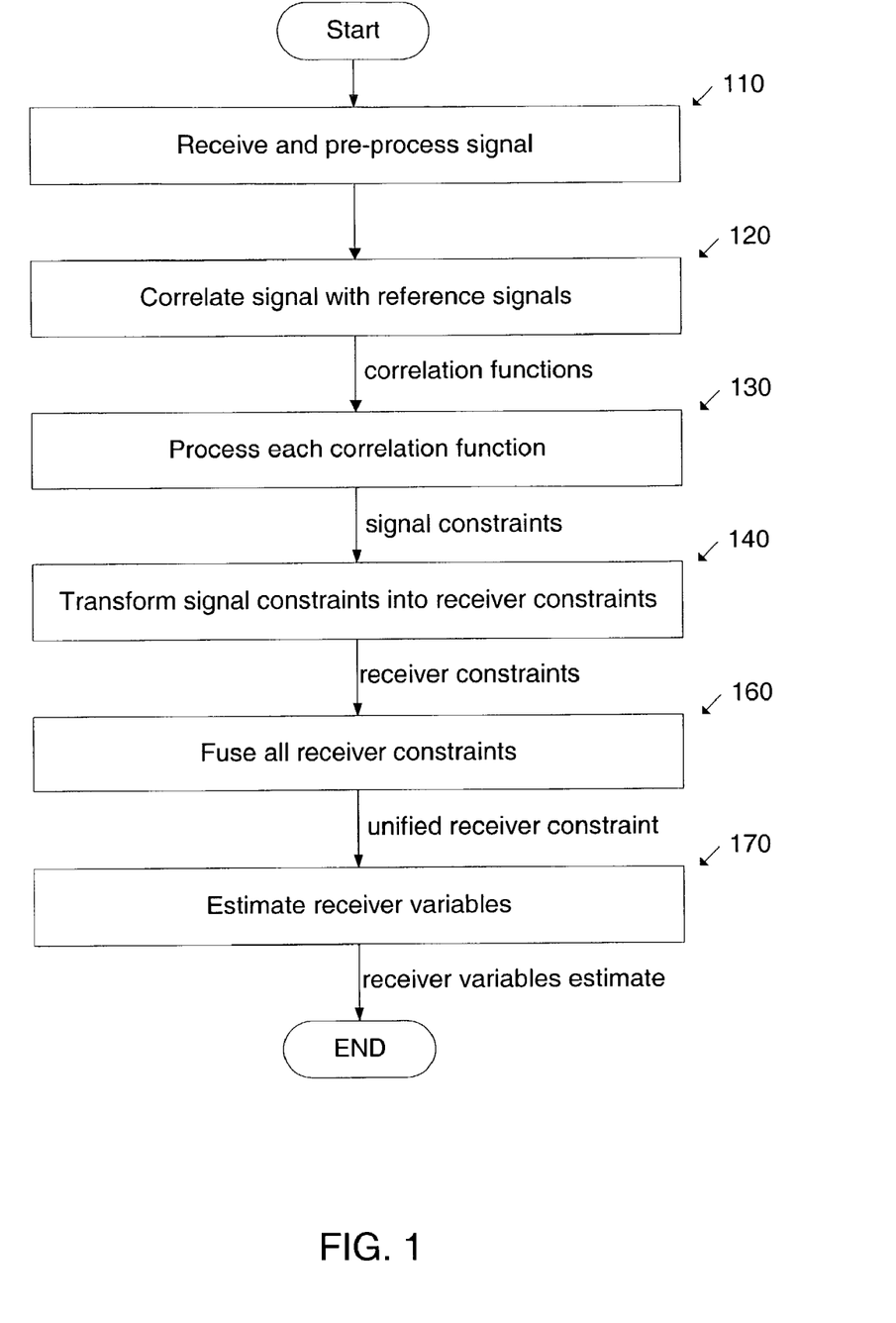
FIG. 1 illustrates a method and a system to estimate receiver variables in a multipath environment.

FIG. 1 describes a general embodiment of the present invention. At 110, the signal is received and pre-processed. For example, pre-processing can include filtering, sampling, and down-converting the received signal to a lower frequency. At 120, the signal is correlated with the reference signal associated with each source from a set of sources. One correlation function, which depends on a code-phase variable and a Doppler frequency variable, is generated for each source. At 130, each correlation function is processed to derive a signal constraint, such as a probability density for the code-phase variable. Steps 120 and 130 involve also the acquisition of the location-determining signals associated with the transmitting sources. Typically, a signal constraint is generated only for the sources that have been successfully acquired. In some embodiments, an uncertainty region for the receiver variables is generated as a byproduct of steps 120 and 130. Additional signal constraints can be obtained from this uncertainty region.

At 140, every constraint on the signal variables is transformed into a constraint on the receiver variables. Receiver variables may include receiver location, receiver velocity, and the offset and drift of the receiver's clock. Source-receiver equations, exemplified in a following section, may be used for this transformation. At 160, all the available receiver constraints are fused and a unified receiver constraint is generated. In addition to the receiver constraints obtained from the signal constraints at 140, the available receiver constraints may include receiver constraints from a-priori knowledge on the receiver, such as an initial estimate on the receiver location and velocity and bounds on these variables. At 170, the final estimate of the receiver variables is extracted from the unified receiver constraint. For example, if the unified receiver constraint is a probability density then the mean value or the global mode of this density may be calculated and returned as the estimate of the receiver variables. In some embodiments, where the unified receiver constraint consists of a region of values, a center point of the region may be returned as an estimate. In some embodiments, the expected error of the estimate and/or a confidence value may be returned together with the estimated value.

Some embodiments of the present invention rely on techniques disclosed in the following U.S. patent applications:

"Signal Acquisition using Data Bit Information", (Ser. No. 09/888,228 filed Jun. 22, 2001, hereafter referred to as Application 228) which is expressly incorporated herein by reference;

"Synthesizing Coherent Correlation Sums at One or Multiple Carrier Frequencies Using Correlation Sums Calculated at a Coarse Set of Frequencies" (Ser. No. 09/888,227 filed Jun. 22, 2001, hereafter referred to as Application 227) which is expressly incorporated herein by reference;

"Extracting Fine-Tuned Estimates from Correlation Functions Evaluated at Limited Number of Values" (Ser. No. 09/888,338 filed Jun. 22, 2001, hereafter referred to as Application 338) which is expressly incorporated herein by reference;

"Determining the Spatio-Temporal and Kinematic Parameters of a Signal Receiver and its Clock by Information Fusion" (Ser. No. 09/888,229 filed Jun. 22, 2001, hereafter referred to as Application 229) which is expressly incorporated herein by reference;

"Determining Location Information Using Sampled Data Containing Location-Determining Signals And Noise" (Ser. No. 09/888,337 filed Jun. 22, 2001, hereafter referred to as Application 337) which is expressly incorporated herein by reference;

"System and method to provide information about the location of a receiver", (Ser. No. 10/237,557, filed on the same day herewith, hereafter referred to as Application E102) which is expressly incorporated herein by reference.

The present invention is better understood upon consideration of the detailed description below and the accompanying drawings.

BRIEF DESCRIPTION OF THE DRAWINGS

The drawings in FIGS. 1–6 illustrate the present invention. It is understood that each of blocks in these drawings represents a task that can be carried out either in software or in hardware. Systems and apparatus to perform these tasks can be designed according to the practice familiar to those skilled in the arts.

SOURCE-RECEIVER EQUATIONS

Before describing several embodiments in more detail, examples of source-receiver equations will be described.

The signal transmitted by source i and traveling through the direct path is received with a delay value and Doppler frequency value that depend on the relative position and velocity of the receiver with respect to the source. The signal delay and the Doppler frequency are also affected by the offset and drift of the receiver's clock.

In some embodiments, the transmitted signal contains a periodic code which is emitted at fixed points in time. Thus, the signal delay is in one-to-one correspondence with the code phase of the received signal, modulo an ambiguity given by an integer multiple of one code period. For example, the codes used by the unified Positioning System (GPS) have a period equal to one millisecond so that knowledge of a GPS code-phase determines the signal delay modulo a multiple of one millisecond. In addition, since the light travels about 300 Kilometers in one millisecond, knowledge of the code-phase and of the exact time at the receiver determines the distance to the source modulo a multiple of 300 Kilometers. Several approaches for resolving this ambiguity are known to those skilled in the art. Therefore, it will now be assumed that the signal delay of the direct path is in one-to-one correspondence with the code-phase of the received signal so that code-phase and signal delay can be treated as equivalent variables. Those skilled in the arts will recognize that code-phase is a circular variable (much like an angle), hence certain operations such as addition should be interpreted appropriately when code-phase variables are involved. A possible meaningful way to interpret equations containing code-phase additions is to re-interpret code-phase variables as delay variables, as those skilled in the arts recognize. This convention is assumed throughout this application.

Application 229 describes source-receiver equations that relate the receiver variables (location, velocity, clock offset and clock drift) to the code-phase and Doppler frequency of the received signal. For simplicity, we only consider the linearized equations. One skilled in the art will recognize that the invention can be practiced in the same way with the non-linear equations in place of the linear ones. The linearized equations are:

$$\tau_i = \tau_i^O + t + \frac{1}{c}\vec{e}_i \cdot \vec{x}, \tag{1}$$

$$f_i = f_i^O + \frac{1}{\lambda}v_0 + \frac{1}{\lambda}\vec{e}_i \cdot \vec{v} + \frac{1}{\lambda}\frac{1}{r_i}\vec{v}_i^\top \cdot \vec{x}, \tag{2}$$

where $\tau_i$ and $f_i$ are the code-phase (in time units) and Doppler frequency of the received signal's component due to source i;

$\tau_i^O$ and $f_i^O$ and the code-phase and Doppler frequency at a given reference point O, that is near the receiver and is stationary with respect to the Earth's surface;

$\vec{\chi}$ and $\vec{\upsilon}$ are the location and velocity of the receiver with respect to O;

$\vec{e}_i$ is the is unit vector from O to the source i;

$\tau_i$ is the distance from O to the source i;

$\vec{\upsilon}_i^\perp$ is the component of the source's velocity $\vec{\upsilon}_i$ perpendicular to $\vec{e}_i$. That is, $\vec{\upsilon}_i^\perp = \vec{\upsilon}_i - (\vec{\upsilon}_i \cdot \vec{e}_i)\vec{e}_i$;

$\lambda$ is the carrier wavelength of the received signal;

c is the speed of light in vacuum;

t is the receiver clock offset;

$\upsilon_0$ is the receiver clock drift measured as a receiver velocity-equivalent, that is, $\upsilon_0/\lambda$ is the Doppler shift due to the clock drift.

The coefficients $\tau_i^O$, $f_i^O$, $\vec{e}_i$, $\vec{\upsilon}_i^\perp$, $\tau_i$, $\lambda$ in equations (1) and (2) can be obtained as described in Application 229.

By introducing the notation $\chi^T=(ct, \vec{\chi})$, $\upsilon^T=(\upsilon_0, \vec{\upsilon})$, and $$g_i^T = \left(0, \frac{1}{r_i}\vec{v}_i^\perp\right),$$

the equations (1) and (2) can be written more concisely as:

$$\tau_i = \tau_i^O + \frac{1}{c}e_i^T x, \tag{3}$$

$$f_i = f_i^O + \frac{1}{\lambda}e_i^T v + \frac{1}{\lambda}g_i^T x, \tag{4}$$

that is, $$\begin{pmatrix} c\tau_i - c\tau_i^O \\ \lambda f_i - \lambda f_i^O \end{pmatrix} = \begin{pmatrix} e_i^T & 0 \\ g_i^T & e_i^T \end{pmatrix}\begin{pmatrix} x \\ v \end{pmatrix} = M_i\begin{pmatrix} x \\ v \end{pmatrix}, \tag{5}$$

where $$M_i = \begin{pmatrix} e_i^T & 0 \\ g_i^T & e_i^T \end{pmatrix}.$$

By letting $\tau^T=(\tau_1, \ldots, \tau_N)$, $f^T=(f_1, \ldots, f_N)$, $E^T=(e_1, \ldots, e_N)$, $G^T=(g_1, \ldots, g_N)$, one obtains $$\begin{pmatrix} c\tau - c\tau^O \\ \lambda f - \lambda f^O \end{pmatrix} = \begin{pmatrix} E & 0 \\ G & E \end{pmatrix}\begin{pmatrix} x \\ v \end{pmatrix} = M\begin{pmatrix} x \\ v \end{pmatrix}. \tag{6}$$

This equation relates the receiver variables (location, velocity, clock offset, clock drift) to the code-phase and Doppler frequency of the received signal. Notice that the top row has space dimensions and the bottom row has velocity dimensions. In the matrix M, E is dimensionless and G has frequency dimensions.

DETAILED DESCRIPTION OF THE PREFERRED EMBODIMENTS

Figure 2:
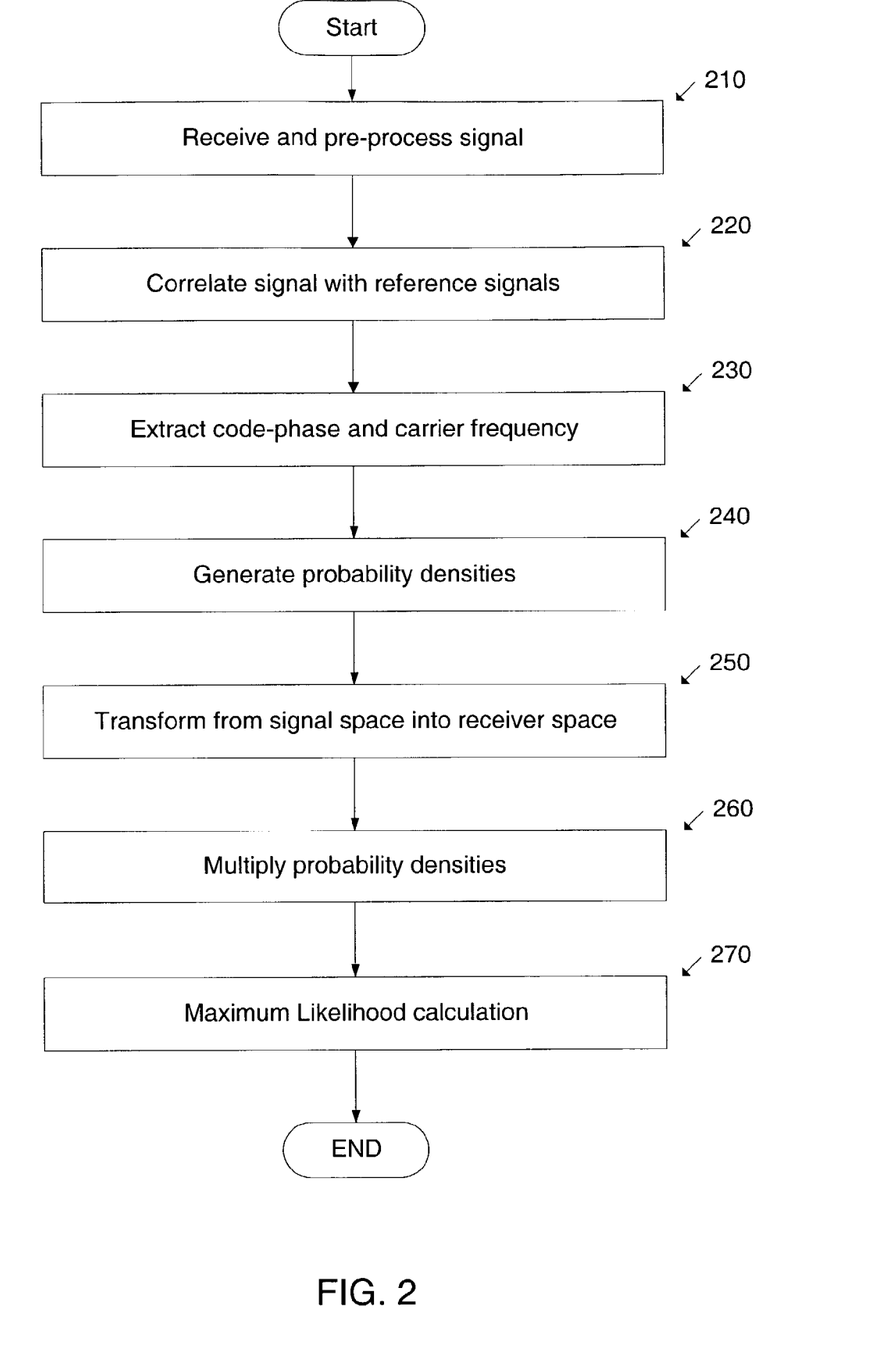
FIG. 2 illustrates a method and a system to estimate receiver variables by using probabilistic constraints.
Figure 3:
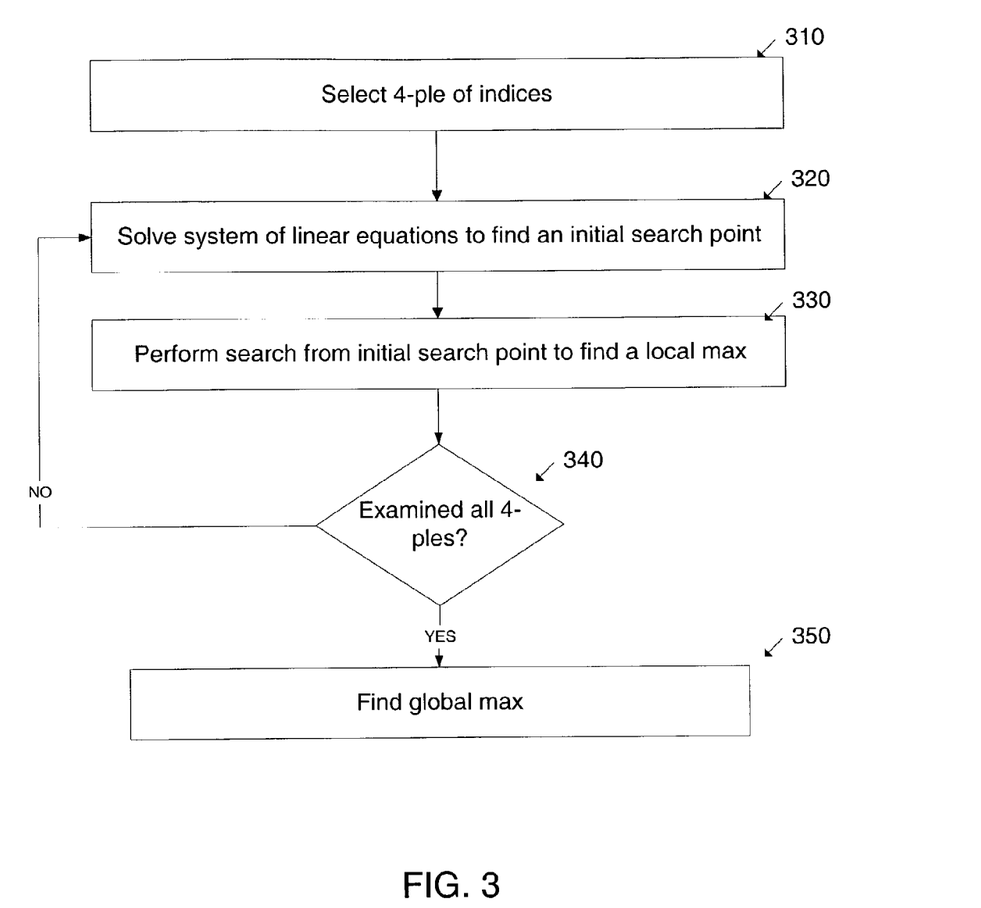
FIG. 3 illustrates a process that is used by some embodiments of the invention to estimate the receiver variables from the unified constraint.

FIG. 2 and FIG. 3 illustrate a preferred embodiment of the invention.

At 210 the signal is received and pre-processed in accordance to methods known to those skilled in the art. At 220, the pre-processed signal is correlated with the reference signals associated with each source. Methods to calculate these correlations are described in Application E102.

At 230, the correlation functions are processed to extract a code-phase value and Doppler frequency value. In some embodiments, this is performed by calculating the ambiguity function:

$$A_i(\tau,f) = I_i^2(\tau,f) + Q_i^2(\tau,f) \tag{7}$$

and by searching for the largest peak of $A_i(\tau, f)$. The location of this peak is denoted $(\hat{\tau}_i, \hat{f}_i)$:

$$(\hat{\tau}_i, \hat{f}_i) = \underset{\tau,f}{\operatorname{argmax}}\, A_i(\tau, f). \tag{8}$$

Only peaks above a sensitivity threshold are considered to be valid, hence not all sources processed yield a code-phase value. Those that do are said to have been "acquired". A method for performing this step efficiently is described in application 338.

In some embodiments, an uncertainty region for the receiver variables is generated as a byproduct of steps 220 and 230, as described in Applications 229 and 337. Additional signal constraints given by uncertainty intervals for the code-phases and the Doppler frequencies may be obtained from this uncertainty region. A confidence value may also be associated with the receiver's uncertainty region and the uncertainty intervals for code-phases and Doppler frequencies. This confidence value expresses the probability that the variables are indeed contained in their uncertainty regions.

The calculations performed at step 240 will be explained in the next several subsections.

Probabilistic Constraint With No Multipath Effects

In an environment free of multipath effects, $\hat{\tau}_i$ can be represented as a Gaussian random variable, $\hat{\tau}_i \sim N(\tau_i, \sigma_i)$. Its mean $\tau_i$ is the expected code-phase at the receiver location, which is given by (1). Its variance $\sigma_i^2$, as those skilled in the art will recognize, is given by:

$$\sigma_i^2 = \frac{\alpha}{SNR \cdot K}, \tag{9}$$

where SNR is the signal-to-noise ratio (that is, the signal power divided by the noise power per Hz); K is the number of independent samples used to calculate the ambiguity function; and $\alpha$ is a constant that can be determined based on characteristics of the pre-processing step 210, such as certain parameters of the the low-pass and bandpass filters used at 210. Another signal-to-noise metric, familar to those skilled in the art, is the $C/N_0$ ratio, given by $$C/N_0 = 10\,\log_{10} SNR.$$

The SNR can be calculated from the magnitude of the correlation peak in a way familiar to those skilled in the arts.

Hereafter, notation such as $\hat{\tau}_i \sim N(\tau_i, \sigma_i)$ will be used to indicate that a method utilizes a particular constraint. In this particular case, $\hat{\tau}_i \sim N(\tau_i, \sigma_i)$ denotes a constraint on $\hat{\tau}_i$ given by the Gaussian density:

$$p(\hat{\tau}_i)d\hat{\tau}_i = \frac{1}{\sqrt{2\pi}\,\sigma_i} e^{-\frac{1}{2}\left(\frac{\hat{\tau}_i - \tau_i}{\sigma_i}\right)^2}. \qquad (10)$$

Generic Constraint with Multipath Effects

Let $\chi_i^{MP}$ be a binary variable indicating the presence of multipath effects in the i-th correlation function. That is, $\chi_i^{MP}=1$ if the i-th location-determining signal was affected by multipath, and $\chi_i^{MP}=0$ otherwise. Then the following generic constraint can be used:

$$\hat{\tau}_i \sim (1 - \chi_i^{MP}) N(\tau_i, \sigma_i) + \chi_i^{MP} U_i^{MP}, \qquad (11)$$

where $U_i^{MP}$ denotes a constraint on the variable $\hat{\tau}_i$ that takes into account multipath effects. The above generic constraint (11) simply states that the location of the correlation peak is described by a Gaussian random variable when no multipath effects are present and by some other constraint $U_i^{Mp}$ when multipath effects are present. Examples of the multipath constraint $U_i^{MP}$ used in different embodiments of the invention are described next.

Probability of Multipath

Let us introduce the parameter $p_i^{MP}$ that represents the probability that the i-th correlation function is affected by multipath. Then (11) becomes:

$$\hat{\tau}_i \sim (1 - p_i^{MP}) N(\tau_i, \sigma_i) + p_i^{MP} U_i^{MP} \qquad (12)$$

This constraint states that the location of the correlation peak has a Gaussian distribution $N(\tau_i, \sigma_i)$ with probability $1 - p_i^{MP}$ and obeys a multipath constraint $U_i^{MP}$ with probability $p_i^{MP}$.

In some embodiments, $p_i^{MP}$ is a fixed parameter. In other embodiments, $p_i^{MP}$ is determined as function of auxiliary variables, such as the SNR estimate, certain features of the correlation function, and/or variables describing the relative position or orientation of the source with respect to the receiver (e.g., the elevation angle, if the source is a satellite). In some embodiments the smaller the SNR, the larger $p_i^{MP}$ is. In some embodiments, $p_i^{MP}$ is constrained to belong to an uncertainty interval, $p_i^{MP} \in [p_i^{MIN}, p_i^{MAX}]$.

Extra Delay Due to Multipath

Multipath effects may move the location of the peak $\hat{\tau}_i$. Most of the time, the largest peak is delayed due to the arrival of reflected signals and the attenuation of the peak corresponding to the direct signal. Therefore, a simple model for a multipathed $\hat{\tau}_i$ is given by a Gaussian density whose mean has been shifted by some amount $\delta$. If the variance $\sigma_i^2$ is assumed to be same, one can define the multipath constraint in (11) and (12) to be $U_i^{MP} = N(\tau_i + \delta, \sigma_i)$.

A more realistic model is obtained if the multipath delay $\delta$ is assumed to be a variable. Pursuant to some embodiments, $\delta$ can be constrained to belong to an uncertainty interval: $\delta \sim [\delta_i^{MIN}, \delta_i^{MAX}]$. In other embodiments, $\delta$ is a random variable with an exponential distribution, $\delta \sim \epsilon(\bar{\delta}_i)$, and with probability density:

$$p(\delta)d\delta = \frac{1}{\bar{\delta}_i} e^{-\frac{\delta}{\bar{\delta}_i}}.$$

The parameter $\bar{\delta}_i$ is chosen according to characteristics of the multi-path environment. For example, in some GPS embodiments, a value chosen in the range 100–500 meters is appropriate. In other embodiments, $\bar{\delta}_i$ is a decreasing function of the signal-to-noise ratio.

A yet more refined model is use a different value of $\sigma_i$ to include the effects of multipath. That is, $U_i^{MP} = N(\tau_i + \delta, \sigma_i^{MP})$. In some embodiments, $\sigma_i^{MP}$ is the sum of three parts: the code-phase variance $\sigma_i$ given by (9); a component that is a decreasing function of the signal-to-noise ratio; and an extra small constant component. Suitable values for these parameters can be determined empirically by a regression method from a database of received and processed signals.

The Convolution-of-Gaussian Density

If $\bar{\delta}_i$ and $p_i^{MP}$ are fixed parameters, then one obtains the probability density constraint:

$$\hat{\tau}_i \sim (1 - p_i^{MP}) N(\tau_i, \sigma_i) + p_i^{MP} (N^*\epsilon)(\tau_i, \sigma_i, \bar{\delta}_i), \qquad (13)$$

where $N^*\epsilon$ denotes the convolution of the Gaussian distribution with the exponential distribution. This density is well approximated by the following expression:

$$p(\hat{\tau}_i) = (1 - p_i^{MP}) \frac{1}{\sqrt{2\pi}\,\sigma_i} e^{-\frac{1}{2}\left(\frac{\hat{\tau}_i - \tau_i}{\sigma_i}\right)^2} + p_i^{MP} \frac{1}{\bar{\delta}_i} e^{\left[\ln(\frac{1}{2})e^{-\frac{\hat{\tau}_i - \tau_i}{\sigma_i}} - \frac{\hat{\tau}_i - \tau_i}{\bar{\delta}_i}\right]}. \qquad (14)$$

In some embodiments, the parameter $\sigma_i$ may be replaced by $\sigma_i^{MP}$. The parameter $\bar{\delta}_i$ in (13) represents the expected extra delay due to reflections. Pursuant to some embodiments, $\bar{\delta}_i$ is calculated from auxiliary variables such as the signal-to-noise ratio, certain features of the correlation function, and/or variables describing the relative position or orientation of the source with respect to the receiver (e.g., the elevation angle, if the source is a satellite). In some embodiments, the smaller the SNR, the larger $\bar{\delta}_i$ is.

Pursuant to some embodiments, $\bar{\delta}_i$ is constrained to belong to an uncertainty interval, $\bar{\delta}_i \sim [\bar{\delta}_i^{MIN}, \bar{\delta}_i^{MAX}]$. When $\bar{\delta}_i$ or $p_i^{MP}$ are constrained to an uncertainty interval, (13) and (14) represent a constraint given by a collection of probability densities.

Transforming Each Density into Receiver Space

At 250, each of the probability densities expressed in terms of signal variables is transformed into a density on the receiver variables. This is done via the source-receiver equations (3) by substituting $\tau_i \to \tau_i(\chi) \equiv \tau_i^O + e_i^T \chi / c$ in (13) and (14). In some embodiments, a small constant $\beta$ is added to the density function (14) to account for the non-zero probability of false acquisition. The resulting density function for $\chi$, henceforth called likelihood function and denoted $L_i(\chi)$, is given by:

$$L_i(x) = (1 - p_i^{MP}) \frac{1}{\sqrt{2\pi}\,\sigma_i} e^{-\frac{1}{2}\left(\frac{\hat{\tau}_i - \tau_i(x)}{\sigma_i}\right)^2} + \quad (15)$$

$$p_i^{MP} \frac{1}{\delta_i} e^{\left[\ln(\frac{1}{2})e^{-\frac{\hat{\tau}_i - \tau_i(x)}{\sigma_i}} - \frac{\hat{\tau}_i - \tau_i(x)}{\delta_i}\right]} + \beta.$$

In this expression, $\hat{\tau}_i$ is the code-phase estimate generated at 230.

Combining the Available Constraints

At 260 all the densities are multiplied together, yielding the unified likelihood density:

$$L(x) = \prod_{i \in S} L_i(x). \quad (16)$$

This product is taken over all sources which have been acquired and any other a-priori density that may be available. It should be noted that $L(\chi)$ depends on the estimated code-phases $\hat{\tau}_i$.

In some embodiments, the receiver is in communication with a network that provides assistance information, as described in Applications 228 and 337. Such information may include the approximate location of the receiver, approximate altitude, and a round-trip delay between the receiver and a basestation. Application 229 teaches how to transform this information into uncertainty region constraints on receiver variables such as location, altitude and time. Similarly, probabilistic constraints in the form of probability densities can be constructed and incorporated as a-priori densities in (16).

Extracting an Estimate of the Receiver Variables

At 270, pursuant to some embodiments of this invention, an estimate for $\chi$ is produced by searching and returning the maximum of (16). This search can be accomplished by one of many possible methods known to those skilled in the art.

Alternatively, other methods familiar to those skilled in the arts can be used to obtain information on the receiver variables from the density (16). These methods comprise: a minimum expected least-square error method; calculating the mean; calculating a region containing a minimum amount of probability mass; calculating the centroid of a region containing a minimum amount of probability mass; etc.

One method to calculate the mean is to use a random sampling method. The algorithm samples from each density independently to generate a sample location. A large number of sample locations are generated and used to compute both the mean location and the expected RMS error.

Initial Search Points

Pursuant to some embodiments of this invention, the search for this maximum can be executed according to the method shown in FIG. 3. At 310, the method selects one group of four indices $\{i_1, i_2, i_3, i_4\} \subset S$. Recall that the indices in S identify the sources for which a code-phase has been extracted and any other likelihood density included in the product in (16), such as, for example, a-priori likelihood densities for the receiver's location, velocity, altitude, etc.

At 320, the method calculates the solution of the linear system of four equations:

$$e_i^{-T} \chi = c\hat{\tau}_i - c\tau_i^O, \; i \in \{i_1, i_2, i_3, i_4\}.$$

At 330, the search for the maximum of $L(\chi)$ is initialized near said solution and a search method is used to find a local maximum in the vicinity of said solution. At 340, the above steps are repeated for another group of indices until all such groups have been processed. Finally, at 350, the group of indices yielding the largest value of the likelihood function is selected and used to calculate the final estimate.

In some embodiments, there are N+2 such indices, where N is the number of acquired sources. The two extra indices are for a density on the receiver's altitude and a density on the receiver's clock offset parameter. In this case there are $$\binom{N+2}{4}$$

initial points. One method to reduce the number of these points is to ignore those points that lie outside an uncertainty region. Other embodiments neglect points associated with sources with a weak signal.

Reverting Back to a Gaussian

Some embodiments calculate the first and second moment of the probability density (13) to approximate it with a Gaussian distribution. Then a conventional least-square method may be used at 270 in place of a maximum likelihood calculation.

Other Embodiments

Using Doppler Frequency Estimates

Figure 4:
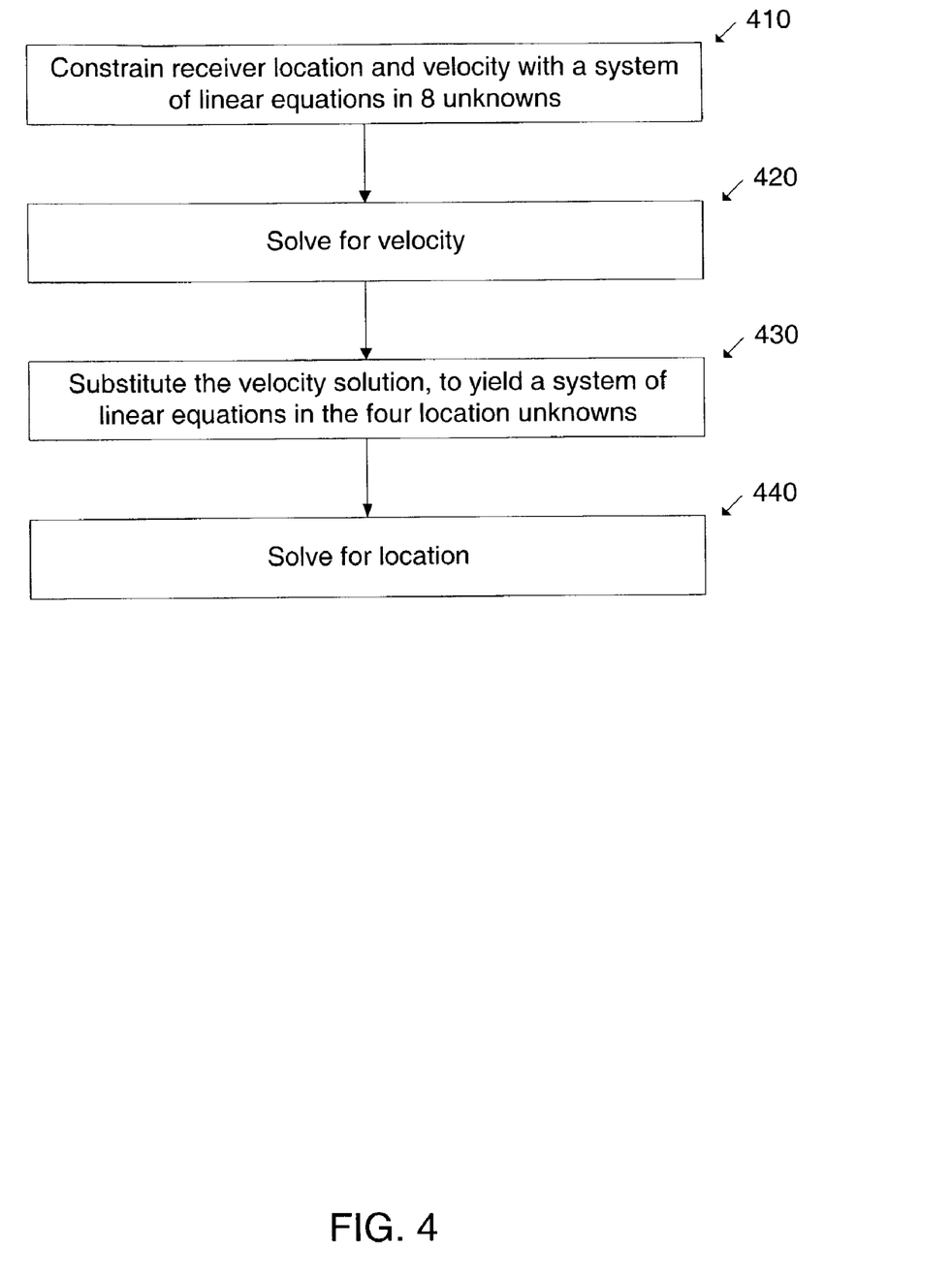
FIG. 4 illustrates some steps performed by a location-determining method and system using Doppler frequency information by means of constraints given by linear equations.

An estimate of the Doppler frequency $f_i$, denoted $\hat{f}_i$, is obtained for each acquired source. FIG. 4 illustrates an embodiment of the present invention which utilizes the Doppler frequency estimates to calculate an estimate of the receiver's location and velocity.

At 410, the system of linear equations:

$$M\begin{pmatrix} x \\ v \end{pmatrix} = \begin{pmatrix} E & 0 \\ G & E \end{pmatrix}\begin{pmatrix} x \\ v \end{pmatrix} = \begin{pmatrix} c\hat{\tau} - c\tau^O \\ \lambda\hat{f} - \lambda f^O \end{pmatrix}. \quad (17)$$

for the eight unknown variables $(\chi, v)$ is constructed by substituting the Doppler frequency estimates $\hat{f}$ in (6). In (17), $\hat{\tau}$ denotes the estimated code-phases.

At 420, a first-order estimate of the velocity $v$ is calculated by neglecting G in (17) and solving the resulting simplified system:

$$Ev = \lambda\hat{f} - \lambda f^O, \quad (18)$$

At 430, the estimate for $v$ is substituted into (17) to yield the following system of equations in $\chi$:

$$\begin{pmatrix} E \\ G \end{pmatrix} \chi = \begin{pmatrix} c\hat{\tau} - c\tau^O \\ \lambda\hat{f} - \lambda f^O - E\hat{v} \end{pmatrix} \quad (19)$$

which has twice as many equations as the commonly used system for the code-phases only. The extra equations incorporate Doppler frequency information into the estimate of receiver location and provide and aid to mitigate the loss of information caused by multipath effects. At 440, a least-square method or other conventional method is used to solve (19) and calculate an estimate for $\chi$.

One skilled in the arts will recognize that a least-square method can be used to solve directly the eight-dimensional system (17) by means of the formula:

$$\begin{pmatrix} x \\ v \end{pmatrix} = (M^T \cdot W \cdot M)^{-1} \cdot M^T \cdot W \cdot \begin{pmatrix} c\hat{\tau} - c\tau^O \\ \lambda\hat{f} - \lambda f^O \end{pmatrix}, \quad (20)$$

where W is a weight matrix that may be used to emphasize those sources for which the signal variable estimates are more reliable. The method described in FIG. 4 is preferable in certain situations because it requires less computational resources.

In some embodiments, the receiver is known to be stationary, hence it is possible to simplify the calculations by setting $\upsilon=(\upsilon_0, 0)$.

Another way to exploit Doppler frequency information is to include likelihood densities based on the estimated Doppler frequencies into the unified likelihood function (16). Some embodiments use likelihood functions given by mixture-of-Gaussian such as:

$$L_i(x) = (1 - p_i^{MP}) \frac{1}{\sqrt{2\pi}\, \sigma_{1,i}} e^{-\frac{1}{2}\left(\frac{\hat{f}_i - f_i(x)}{\sigma_{1,i}}\right)^2} + p_i^{MP} \frac{1}{\sqrt{2\pi}\, \sigma_{2,i}} e^{-\frac{1}{2}\left(\frac{\hat{f}_i - f_i(x)}{\sigma_{2,i}}\right)^2} \quad (21)$$

where $\sigma_{1,i} \ll \sigma_{2,i}$ and $$f_i(\chi) = \lambda f_i^O + e_i^{-T} \hat{v} + g_i^T \chi.$$

Uncertainty Region Constraints

Some embodiments utilize signal constraints given by uncertainty intervals such as, for example, $\hat{\tau}_i \sim [\tau_1, \tau_2]$. In some embodiments, constraints of this type are generated as a byproduct of the correlation and acquisition stages (e.g., 120 and 130 in FIG. 1), as described in more detail in Application 229.

If multipath effects are neglected then one can pick $[\tau_1, \tau_2]$ to have a pre-specified width and be symmetric about an initial code-phase estimate $\bar{\tau}_i$ (for example, $\bar{\tau}_i = \tau_i^O$). In some embodiments, this width depends on the signal-to-noise ratio and a pre-specified confidence parameter $\gamma$. For instance, $\tau_1$ and $\tau_2$ can be chosen so that $$\int_{\tau_1}^{\tau_2} p(\hat{\tau}_i)\, d\hat{\tau}_i = 1 - \gamma. \quad (22)$$

where p is given by (10).

In some embodiments, multipath effects are taken into account by extending the uncertainty interval on the right hand side of $\bar{\tau}_i$:

$$\hat{\tau}_i \sim [\bar{\tau}_i - w_1, \bar{\tau}_i + w_2], \; w_2 > w_1.$$

In some embodiments, $w_2 = \infty$.

Combining Uncertainty Regions with Probabilistic Constraints

Some embodiments utilize both an uncertainty interval constraint $\hat{\tau}_i \sim [\tau_1, \tau_2]$ and a probability density constraint $\hat{\tau}_i \sim p(\bullet)$.

Pursuant to some embodiments, a new probability density is generated by truncating and normalizing $p(\bullet)$ to be concentrated inside $[\tau_1, \tau_2]$:

$$p'(\hat{\tau}_i) = \frac{p(\hat{\tau}_i)}{\int_{\tau_1}^{\tau_2} p(z)\, dz}, \; \tau_1 \leq \hat{\tau}_i \leq \tau_2, \; p'(\hat{\tau}_i) = 0, \; \hat{\tau}_i \neq [\tau_1, \tau_2]. \quad (23)$$

In some embodiments, the conditioned density p' is approximated by a Gaussian density by calculating the first and second moment of p'. This makes it possible to obtain a unified Gaussian density and to estimate the receiver variables with a conventional least-squares method.

Some embodiments combine the uncertainty region constraint with the density constraint to calculate a multipath probability $p_i^{MP}$. One way to do this is to evaluate the distance of the estimated code-phase $\hat{\tau}_i$ from the uncertainty interval $[\tau_1, \tau_2]$ and compare this distance to the code-phase variance $\sigma_i$ given by (9). If the ratio of this distance to $\sigma_i$ is much larger than one, then $p_i^{MP}$ is set to one, e.g. the source is considered to be corrupted by multipath. If, on the other hand, the distance is zero, that is $\hat{\tau}_i \in [\tau_1, \tau_2]$, then $p_i^{MP}$ is set to zero or to a very small number. Another way to calculate $p_i^{MP}$ is to integrate a probability density such as (10), (13), or (14), inside the uncertainty interval and to let $p_i^{MP}$ be an increasing function of the integrated probability.

Using Multipath-Mitigating Constraints During Correlation and Acquisition

Figure 5:
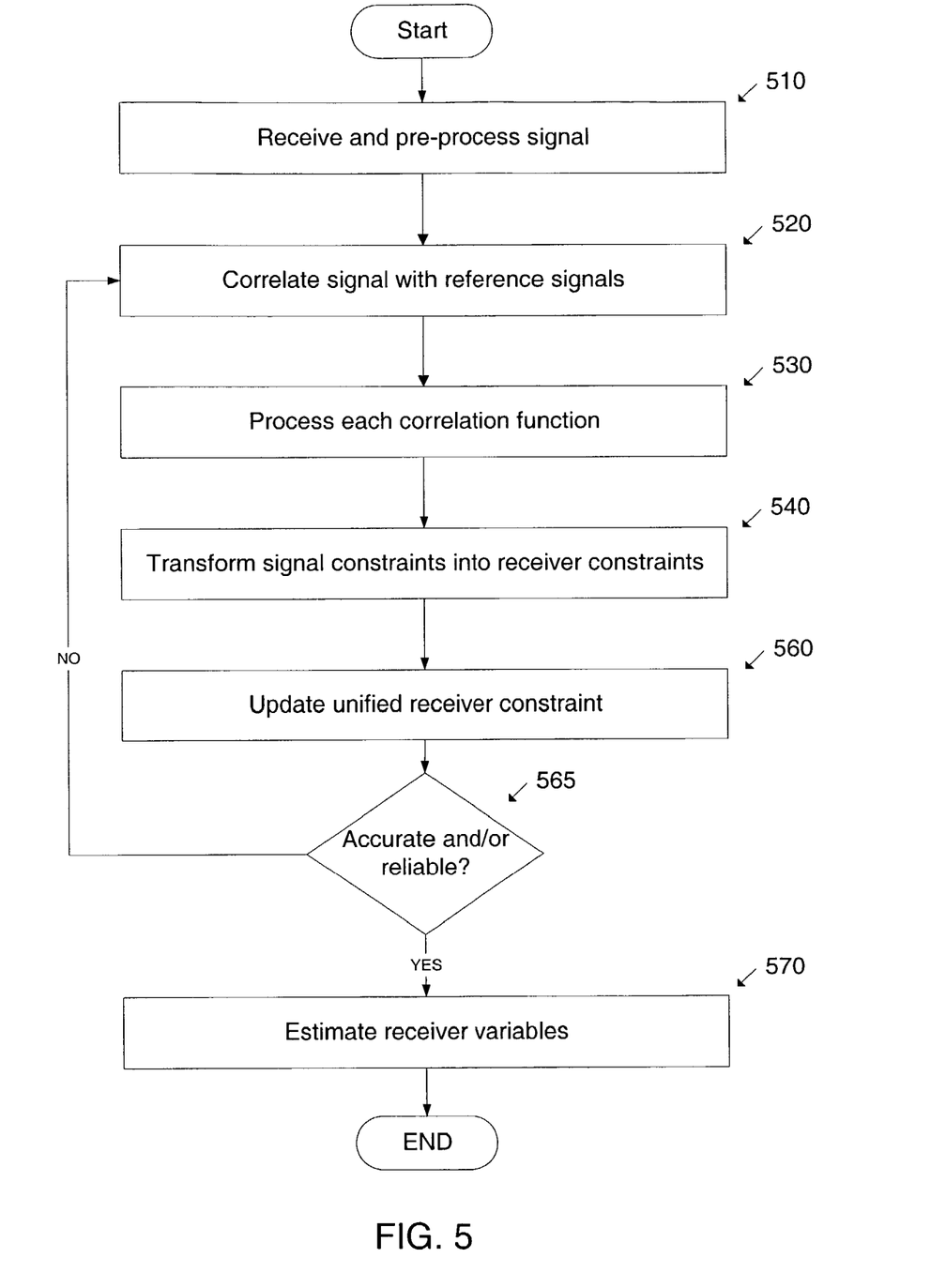
FIG. 5 illustrates a location-determining method and system where constraints based on multipath mitigation techniques are used for signal correlation and acquisition.

FIG. 5 illustrates some iterative embodiments where multipath-mitigating uncertainty intervals for the signal variables are fed back into the correlation/acquisition stages. At 510, the signal is received and pre-processed as in 110. At 520 and 530, the method calculates the correlations and acquires the location-determining signals, as described in Applications E102 or Application 229. However, uncertainty intervals for code-phases and possibly Doppler frequencies are determined according to the multipath mitigation methods just described. Updated signal constraints are generated at 530 and transformed into receiver constraints at 540. At 560, the unified receiver constraint is updated and control returns to 520 to refine the correlations, if needed. When the process determines (at 565) that enough information has been gathered to achieve the required accuracy and/or reliability, the process transitions to 570, at which the final estimate of the receiver variables is calculated.

Utilizing a Constraint Given by a Collection of Densities

Some embodiments utilize constraints given by collections of probability densities. Some of these embodiments calculate a location by evaluating a $\chi^2$ statistical test for these densities. The purpose of the $\chi^2$ test is to determine which density best describes the data. Once a density has been chosen, the receiver variable can be determined based on the chosen density according to conventional estimation method such as a maximum likelihood method or a least-squares method. Those skilled in the arts will recognize that other methods can be used in place of the $\chi^2$ test to choose a density.

Figure 6:
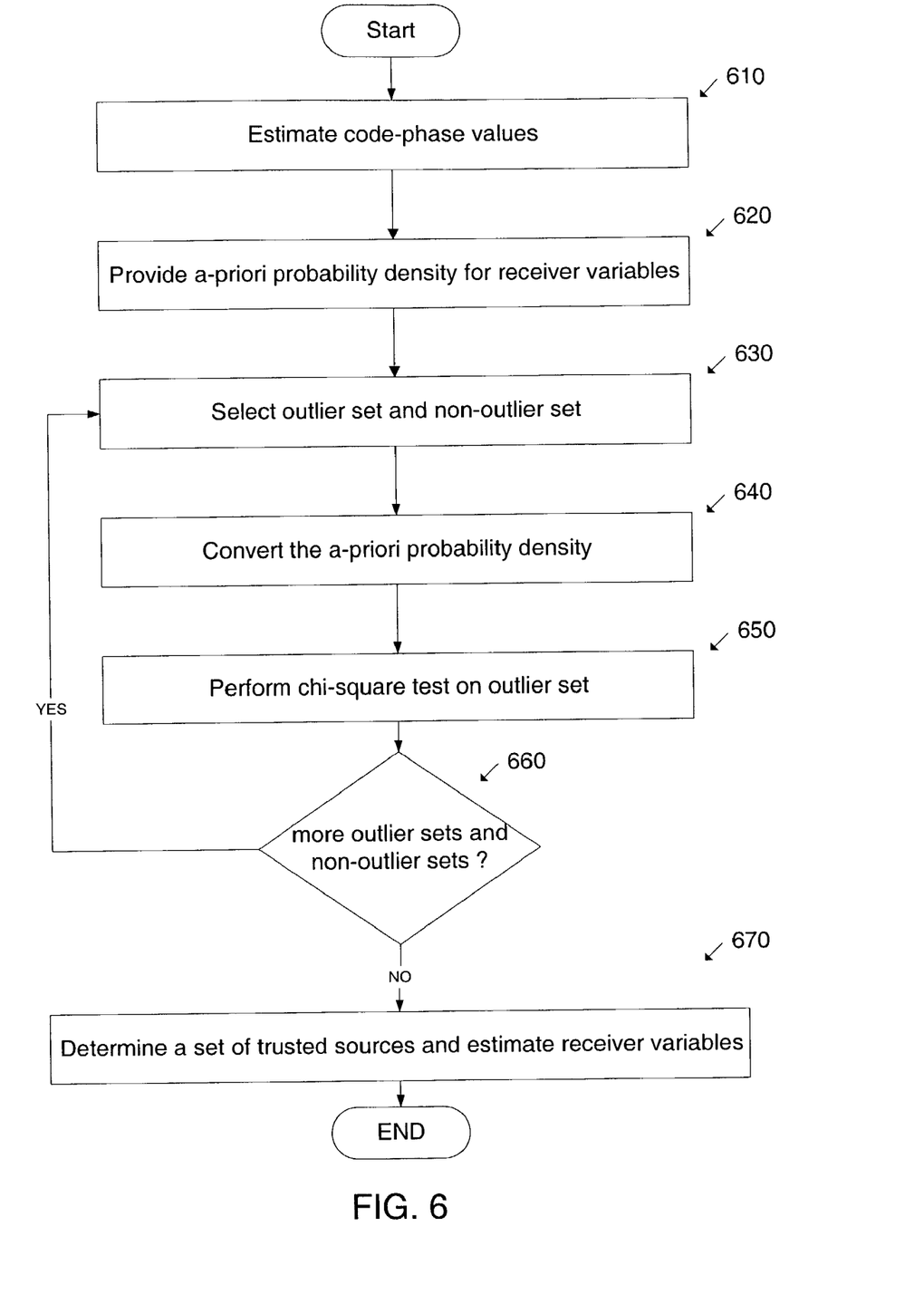
FIG. 6 illustrates a location-determining method and system based on identifying a set of outlier sources and a set of trusted sources.

Other examples of embodiments utilizing collection-of-density constraints, in addition to the embodiments described in previous sections, are those that identify an outlier set of signal sources and a non-outlier set of signal sources. FIG. 6 illustrates a process used by these embodiments. At 610, code-phase values $\hat{\tau}_i$ are estimated from the correlation functions, and signal constraints of the form $\hat{\tau}_i \sim (1-\chi_i^{MP}) N(\tau_i, \sigma_i)$ are generated, where $\chi_i^{MP}$ is a binary variable which indicates the presence or absence of multipath effects ($\chi_i^{MP}=1$ when multipath effects are present). Notice that when $\chi_i^{MP}=1$ this constraint is null, indicating that no information is available on the code-phase when multipath-effects occur.

At 620, a Gaussian a-priori distribution $\chi \sim N(0,\Omega)$ for the receiver variables $\chi$ is provided. In some embodiments, $\Omega$ is a diagonal matrix describing the variance of the receiver variables with respect to a provided initial estimate of said variables. Specifically, $\Omega_{11}$ and $\Omega_{22}$ describe the expected error in the latitude and longitude, $\Omega_{33}$ is the variance of the altitude estimate, and $\Omega_{00}$ is the variance of the time offset t.

At 630, the process selects a set of outlier code-phases and a set of non-outlier code-phases. The code-phases in the outlier set are denoted $\hat{\tau}_1, \ldots, \hat{\tau}_k$, or $\hat{\tau}_{(1)}$ collectively, and the code-phases in the non-outlier set are denoted $\hat{\tau}_{k+1}, \ldots, \hat{\tau}_n$, or $\hat{\tau}_{(2)}$ collectively. Also, define:

$$\hat{\tau} = \begin{bmatrix} \hat{\tau}_{(1)} \\ \hat{\tau}_{(2)} \end{bmatrix}, \tau^O = \begin{bmatrix} \tau_{(1)}^O \\ \tau_{(2)}^O \end{bmatrix},$$

Notice that $\tau_{(1)}^O \in \Re^k$ and $\tau_{(2)}^O \in \Re^{n-k}$.

At 640, the Gaussian constraint $\chi \sim N(0,\Omega)$ is converted into the constraint $\hat{\tau} \sim N(\tau^O, C)$, where:

$$C = E_n \Omega E_n^T + \Sigma;$$

the matrix $E_n$ represents the linear transformation between the receiver variables $\chi$ and the code-phases $\hat{\tau}$, much like E in (6).

$\Sigma = \text{diag}(\sigma_1^2, \ldots, \sigma_n^2)$, where $\sigma_i$ is the variance of the code-phases due to noise other than multipath effects. In some embodiments, $\sigma_i$ is given by (9).

The matrix C is partitioned accordingly:

$$C = \begin{bmatrix} C_{11} & C_{12} \\ C_{21} & C_{22} \end{bmatrix},$$

where $C^{11} \in \Re^{k \times k}$, $C^{12} \in \Re^{k \times (n-k)}$, $C^{21} \in \Re^{(n-k) \times k}$, and $C^{22} \in \Re^{(n-k) \times (n-k)}$. A Gaussian probability density $$\hat{\tau}_{(2)} \sim N(\hat{\tau}'_{(2)}, C^{22}) \tag{24}$$

is associated to the particular selection of non-outlier code-phases. Each of these densities is included into a unified constraint given by a collection of probability densities.

At 650, a $\chi^2$ test is performed for the outlier set. This is done by testing the hypothesis that the outlier set indeed contains at least one outlier. If not, then $\hat{\tau}_{(1)}$ is constrained by $N(\tau^O, C)$ so that, by conditioning on the non-outlier set $\tau_{(2)}^O$:

$$(\hat{\tau}_{(1)}|\hat{\tau}_{(2)}) \sim N(\hat{\tau}'_{(1)}, \overline{C}^{11}),$$

where $$\hat{\tau}'_{(1)} = \tau_{(1)}^O + C^{12}(C^{22})^{-1}(\hat{\tau}_{(2)} - \tau_{(2)}^O),$$

and $$\overline{C}^{11} = C^{11} - C^{12}(C^{22})^{-1}C^{21}.$$

This distribution then is centered with a similarity transformation to produce a k-dimensional unit Gaussian vector:

$$\upsilon = (\overline{C}^{11})^{-1/2}(\hat{\tau}^1 - \overline{\tau}^1)$$

A k-degree-of-freedom $\chi^2$ test on $\|\upsilon\|^2$ is then performed.

At 660, the process checks if all outlier sets and non-outlier sets of interest have been processed. If yes, then control is transferred to 660. At 670, a probability density from the collection of all densities (24) is chosen based on the results of the $\chi^2$ tests and also on the amount of information that each density provides about the receiver location. This density corresponds to a selection of non-outlier sources that are designed as "trusted sources" (not affected by multipath). The chosen density is then used to calculate an estimate of the receiver variables.

The above detailed description is provided to illustrate specific embodiments of the present invention and is not intended to be limiting. Numerous variations and modifications within the scope of the present invention are possible. The present invention is set forth in the following claims.

We claim:

1. A method for determining location information of a receiver in a multipath environment, the method comprising the steps of:
   receiving a signal containing a plurality of location-determining signals associated with a plurality of signal sources, wherein each of said signal sources is associated with a reference signal;
   correlating said signal with said reference signals to yield a plurality of correlation functions;
   generating a signal constraint from each correlation function;
   transforming said signal constraints into receiver constraints;
   fusing said receiver constraints to yield a unified receiver constraint; and
   determining said location information based on said unified receiver constraint.

2. The method of claim 1, wherein one of said signal constraints comprises a code-phase probability density based on an estimated code-phase value.

3. The method of claim 2, wherein said code-phase probability density is further based on a multipath probability and an average multipath delay.

4. The method of claim 1, wherein said fusing comprises multiplying together a plurality of multipath probability densities to yield a unified probability density.

5. The method of claim 4, wherein said determining location information comprises performing a maximum likelihood calculation with said unified probability density.

6. The method of claim 5, wherein said determining location information further comprises calculating a plurality of initial search points and performing a search from said initial search points.

7. The method of claim 6, further comprising discarding initial search points not contained in an uncertainty region.

8. The method of claim 3, wherein said multipath probability and said average multipath delay are based on a plurality of auxiliary variables.

9. The method of claim 8, wherein said plurality of auxiliary variables comprises a signal-to-noise-ratio.

10. The method of claim 1, wherein said generating a signal constraint further comprises summing a multipath-free density and multipath-affected density.

11. The method of claim 10 wherein said multipath-affected density is a convolution of a Gaussian density with an exponential density.

12. The method of claim 4, wherein said plurality of probability densities comprises a plurality of a-priori probability densities.

13. The method of claim 2, wherein said code-phase probability density is a gaussian density based on a plurality of auxiliary variables and said fusing comprises performing a least-square estimation method.

14. The method of claim 2, wherein one of said signal constraints further comprises a doppler probability density based on an estimated doppler frequency value.

15. The method of claim 1, wherein said receiver constraint comprises a system of equations in said receiver variables.

16. The method of claim 15, wherein said system of equations comprises equations based on an estimated code-phase value and equations based on an estimated frequency value.

17. The method of claim 16, wherein a receiver velocity variable is set to zero.

18. The method of claim 1, wherein one of said signal constraints comprises an uncertainty interval.

19. The method of claim 18, wherein said uncertainty interval depends on a plurality of auxiliary variables.

20. The method of claim 18, wherein said uncertainty interval is a code-phase uncertainty interval and is extended on one side to account for multipath effects.

21. The method of claim 19, wherein said code-phase uncertainty interval extends to infinity on one side.

22. The method of claim 1, wherein one of said signal constraints comprises a probability density and an uncertainty interval.

23. The method of claim 22, wherein generating a signal constraint further comprises truncating said probability density to said uncertainty interval, yielding a truncated probability density.

24. The method of claim 22, wherein said generating a signal constraint further comprises calculating a distance between an estimated code-phase value and said uncertainty interval and calculating a multipath probability by comparing said distance with a code-phase variance value.

25. The method of claim 22, wherein said generating a signal constraint further comprises calculating an integral of said probability density inside said uncertainty interval.

26. The method of claim 18, wherein said uncertainty interval accounts for multipath effects and is utilized for searching said location-determining signals.

27. The method of claim 1, wherein one of said signal constraints comprises a collection of probability densities.

28. The method of claim 27, wherein said collection of probability densities is parameterized by a multipath probability.

29. The method of claim 27, wherein said collection of probability densities is parameterized by a multipath delay parameter.

30. The method of claim 1, further comprising selecting a probability density from a collection of probability densities.

31. The method of claim 30, wherein each density in said collection of probability densities is associated with a set of non-outlier signal sources.

32. The method of claim 31, wherein said selecting a probability density is based on a chi-square statistical test.

33. The method of claim 30, wherein said selecting a probability density is based on a chi-square statistical test.

34. A method for determining velocity information of a receiver in a multipath environment, the method comprising the steps of:
receiving a signal containing a plurality of location-determining signals associated with a plurality of signal sources, wherein each of said signal sources is associated with a reference signal;
correlating said signal with said reference signals to yield a plurality of correlation functions;
generating a signal constraint from each correlation function;
transforming said signal constraints into receiver constraints;
fusing a plurality of receiver constraints to yield a unified receiver constraint; and
determining said velocity information based on said unified receiver constraint.

35. The method of claim 12, wherein said a-priori probability densities comprise an a-priori probability density based on a round-trip delay information.

36. The method of claim 12, wherein said probability densities comprise an a-priori probability density based on a base-station sector information.

37. The method of claim 12, wherein said a-priori probability densities comprise an a-priori probability density based on an altitude information.

38. A location determining system for a multipath environment comprising:
a plurality of signal sources associated with a plurality of reference signals;
a receiver, receiving a signal containing a plurality of location-determining signals transmitted by said signal;
means for correlating said signal with said plurality of reference signals to yield a plurality of correlation functions;
means for generating a signal constraint from each correlation function;
means for transforming said signal constraints into receiver constraints;
means for fusing said receiver constraints to yield a unified receiver constraint; and means for determining said location information based on said unified receiver constraint.

39. The system of claim 38, wherein one of said signal constraints comprises a code-phase probability density based on an estimated code-phase value.

40. The system of the claim 38, comprising means for performing a maximum likelihood calculation with said probability density.

41. The system of claim 40, wherein said means for performing a maximum likelihood calculation further comprises means for calculating a plurality of initial search points and means for performing a search from said initial search points.

42. The system of claim 38, wherein said signal constraint comprises a multipath free density and a multipath-affected density.

43. The system of claim 39, wherein said signal constraint further comprises a doppler probability density based on an estimated doppler frequency value.

44. The system of claim 38, wherein said receiver constraint comprises a system of equations in said receiver variables, and wherein said system of equations comprises equations based on an estimated code-phase value and equations based on an estimated frequency value.

45. The system of claim 38, wherein said signal constraint comprises a code-phase uncertainty interval extended on one side to account for multipath effects.

46. The system of claim 38, wherein one of said signal constraints comprises a probability density and an uncertainty interval.

47. The system of claim 38, comprising means for searching said location determining signals based on a code-phase uncertainty that accounts for multipath effects.

48. The system of claim 38, further comprising means for selecting a probability density from a collection of probability densities.

49. The system of claim 38, further comprising means for performing a chisquare statistical test and means for selecting a probability density based on said chisquare statistical test.

50. The system of claim 38, comprising means for providing a plurality of a-priori probability densities.

51. The system of claim 50, wherein said a-priori probability densities comprise an a-priori probability density based on a round-trip delay information.

52. The system of claim 50, wherein said a-priori probability densities comprise an a-priori probability density based on a base-station sector information.

53. The system of claim 50, wherein said a priori probability densities comprise an a-priori probability density based on an altitude information.

54. A velocity determining system for a multipath environment comprising:
   a plurality of signal sources associated with a plurality of reference signals;
   a receiver, receiving a signal containing a plurality of location-determining signals transmitted by said signal;
   means for correlating said signal with said plurality of reference signals to yield a plurality of correlation functions;
   means for generating a signal constraint from each correlation function;
   means for transforming said signal constraints into receiver constraints;
   means for fusing said receiver constraints to yield a unified receiver constraint; and
   means for determining said velocity information based on said unified receiver constraint.

55. The method of claim 2, wherein said determining location information comprises calculating the mean value of said unified receiver constraint.

56. The method of claim 2, wherein said determining location information comprises calculating the mean value of said unified receiver constraint by means of a random sampling method.

* * * * *